United States Patent
Sanders et al.

(10) Patent No.: US 10,971,115 B2
(45) Date of Patent: Apr. 6, 2021

(54) FOVEATED RENDERING SYSTEM AND METHOD

(71) Applicant: Sony Interactive Entertainment Inc., Tokyo (JP)

(72) Inventors: Matthew William Sanders, Middlesex (GB); Nigel John Williams, London (GB); Richard James Forster, London (GB); Andrew William Walker, London (GB); Jessica Rose Grant, London (GB)

(73) Assignee: Sony Interactive Entertainment Inc., Tokyo (JP)

(*) Notice: Subject to any disclaimer, the term of this patent is extended or adjusted under 35 U.S.C. 154(b) by 0 days.

(21) Appl. No.: 16/559,965

(22) Filed: Sep. 4, 2019

(65) Prior Publication Data
US 2020/0082794 A1    Mar. 12, 2020

(30) Foreign Application Priority Data

Sep. 6, 2018 (GB) .................................. 1814507

(51) Int. Cl.
G09G 5/373 (2006.01)
G06F 3/01 (2006.01)
H04L 29/08 (2006.01)

(52) U.S. Cl.
CPC ............. *G09G 5/373* (2013.01); *G06F 3/012* (2013.01); *G06F 3/013* (2013.01); *G09G 2340/045* (2013.01); *G09G 2340/0407* (2013.01); *G09G 2340/0464* (2013.01); *G09G 2354/00* (2013.01); *H04L 67/306* (2013.01)

(58) Field of Classification Search
None
See application file for complete search history.

(56) References Cited

U.S. PATENT DOCUMENTS

| | | | |
|---|---|---|---|
| 6,535,644 B1 | 3/2003 | Kurapati | |
| 2014/0267420 A1* | 9/2014 | Schowengerdt | G06F 3/012 345/633 |
| 2016/0026253 A1* | 1/2016 | Bradski | H04N 13/344 345/8 |
| 2017/0090563 A1* | 3/2017 | Gustafsson | G06K 9/00604 |
| 2017/0287446 A1* | 10/2017 | Young | G02B 27/0101 |
| 2019/0204913 A1* | 7/2019 | Sarkar | G06F 3/017 |

FOREIGN PATENT DOCUMENTS

| | | |
|---|---|---|
| EP | 1301021 A2 | 4/2003 |
| EP | 1403680 A1 | 3/2004 |

OTHER PUBLICATIONS

Combined Search and Examination Report for corresponding GB Application No. 1814507.8, 3 pages, dated Mar. 7, 2019.
Extended European Search Report for corresponding EP Application No. 19191068.6, 10 pages, dated Feb. 6, 2020.

* cited by examiner

Primary Examiner — Matthew Yeung
(74) Attorney, Agent, or Firm — Matthew B. Dernier, Esq.

(57) ABSTRACT

A foveated rendering system for modifying content to be displayed includes a user profile obtaining unit operable to obtain a user profile comprising information about head motion and eye motion for a user, and a foveated rendering unit operable to apply a foveated rendering process to the content to be displayed in dependence upon obtained user profile information.

11 Claims, 7 Drawing Sheets

300

300

300

FOVEATED RENDERING SYSTEM AND METHOD

BACKGROUND

This disclosure relates to a foveated rendering system and method.

In recent years there has been a trend towards providing more natural inputs for users of processing devices, such as video consoles or computers. For example, motion sensing controllers may be provided that enable a user to use gestures to input commands rather than relying entirely on button presses. While considered to be an intuitive manner of inputting commands, in some cases this may not be desirable due to the cost or inconvenience associated with the use of dedicated input devices; this is particularly true when applications or hardware have dedicated hardware that cannot be used for other purposes, as users may wish to make use of a number of different applications or hardware arrangements.

Another example of such an input is that of tracking a user with one or more cameras; for example, tracking hand gestures, head motion or eye motion. The cameras may be associated with a games console or a computer, for example, or may be part of a standalone tracking system. Such methods may enable a user to interact with a system without the use of any peripherals, and as such may be considered to be natural and convenient input methods. However, these user-tracking methods may also have a number of potential drawbacks.

For instance, providing gesture-based inputs may require a user to position themselves in an area with a lot of room for movement, which may be inconvenient. Additionally, by having to move body parts the user may become tired or uncomfortable—particularly if the motion is frequent, repetitive, or unnatural to the user, or if they have limited mobility. Such problems may become more apparent when used in combination with a virtual reality (VR) arrangement in which a user views content on a head-mountable display (HMD); in this example use case, the user is unable to see obstacles in the real environment and may need to move more as the (potential) display area is increased (as the user is generally placed in a virtual environment that exists in every direction) relative to a fixed display such as a television.

SUMMARY

In view of this, it is considered desirable to provide a more comfortable user experience to enhance the user's enjoyment of interactive content. In particular, a system and method for providing an improved camera-based tracking and interaction may be desirable.

It is in the context of the above problems that the present invention arises.

BRIEF DESCRIPTION OF THE DRAWING

Embodiments of the present invention will now be described by way of example with reference to the accompanying drawings, in which:

FIG. 12 schematically illustrates a foveated rendering method.

FIG. 13 schematically illustrates a user profile generating method for generating a user profile for use with a processing device operable to display content.

DETAILED DESCRIPTION

While the specification refers largely to arrangements in which an HMD is the display device used to display content to a user, the teachings provided may be equally applicable to more traditional arrangements in which a television (or other display) is used to present content to the user.

Figure 1:
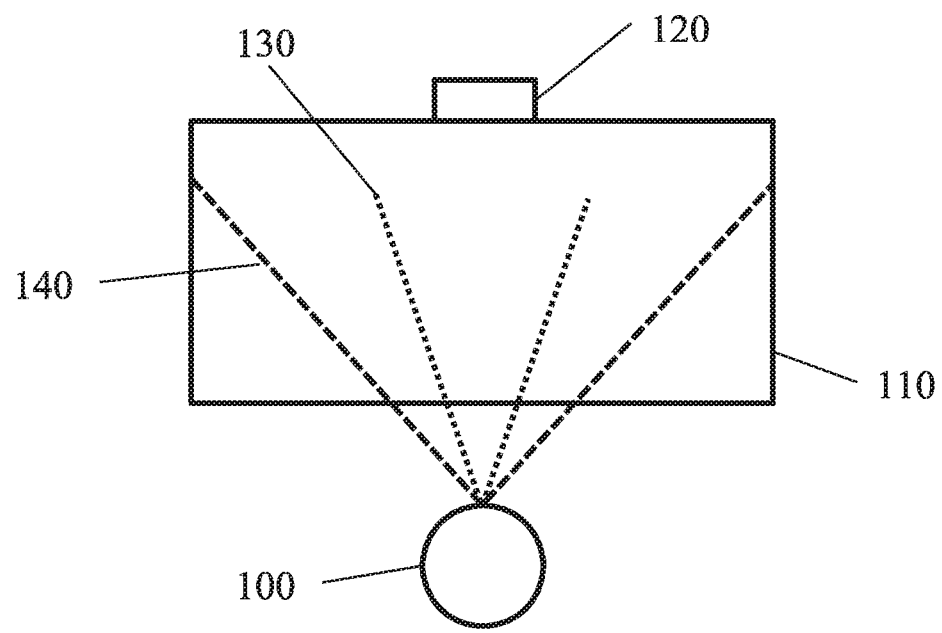
FIG. 1 schematically illustrates a content viewing arrangement.

FIG. 1 provides a schematic illustration of such an arrangement; as is apparent from this illustration, the user's gaze is directed towards only a portion of the display, and as a result the user is required to move their head in order to view other portions of the display.

In this Figure, the user 100 is viewing content presented on the display 110. A camera 120 is also shown on top of the display 110; the camera 120 may be used track a user's motion (for example, eye, head or body motion). The cone 130 represents the viewing angle for the user 100 looking straight ahead, ignoring peripheral vision areas. The cone 130 may be moved either by the user 100 moving their eyes, head, or whole body (for example). The cone 140 represents the required viewing angle to view the whole of the display 110—as this is clearly larger than the cone 130, it is expected that the user will have to move their head and/or eyes in order to view the whole of the display 110.

Figure 2:
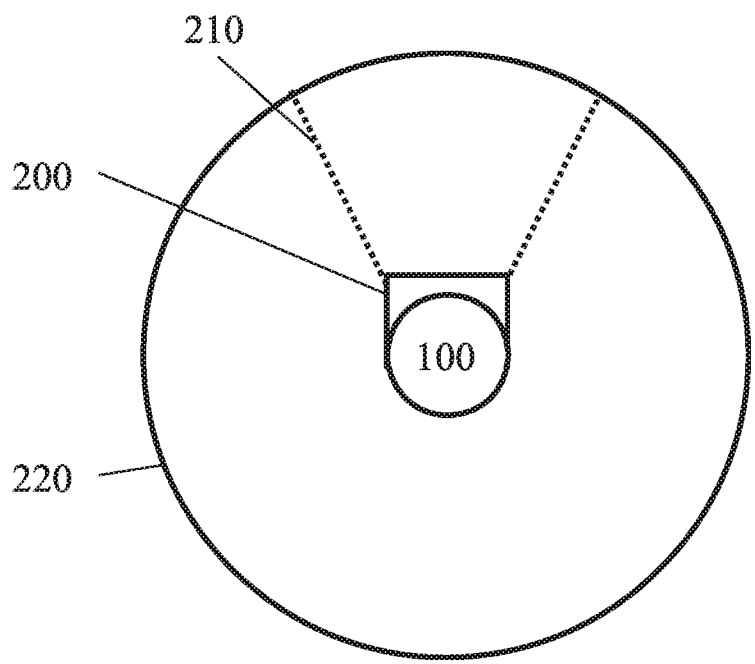
FIG. 2 schematically illustrates a second content viewing arrangement.

An alternative arrangement is shown in FIG. 2, which schematically illustrates a comparable arrangement in which a user 100 instead uses an HMD 200 as a display device. the user 100 is presented with a view corresponding the region 210 of the virtual environment 220. In this case, the user is able to view different areas of the region 210 using eye movement alone, while viewing areas outside of the virtual environment 220 of the region 210 may also require head motion.

In each of these arrangements it is necessary for users to move their head and/or their eyes in order to view all of the content that is displayed (and/or able to be displayed, in the case of the HMD). However, the use of head and/or eye motion for viewing content out of the user's immediate field of view may vary from person to person.

For example, some users may rely heavily on head motion and entirely forgo eye motion—whenever the user wishes to view something that is not directly in front of them, they move their head until the target is directly in front of them. Of course, such users may be rare and it is expected that at least some eye motion is used.

At the other end of the spectrum, there may be users that rely heavily on eye motion, such that head motion is only performed when it is physically impossible for the user to view content at that head position.

It would be expected that most users would exist somewhere on the spectrum between these two extremes, such that different users may use different combinations of head and eye motion to acquire a desired view.

It is generally considered that eye motion is less demanding and more comfortable for a user than head motion, especially during extended viewing sessions. It may therefore be advantageous to tailor a user experience to take into account when a viewer will move their head and/or eyes; this may be of particular interest in view of interactive content, where head and/or eye motion may be used to provide inputs to the content.

Figure 3:
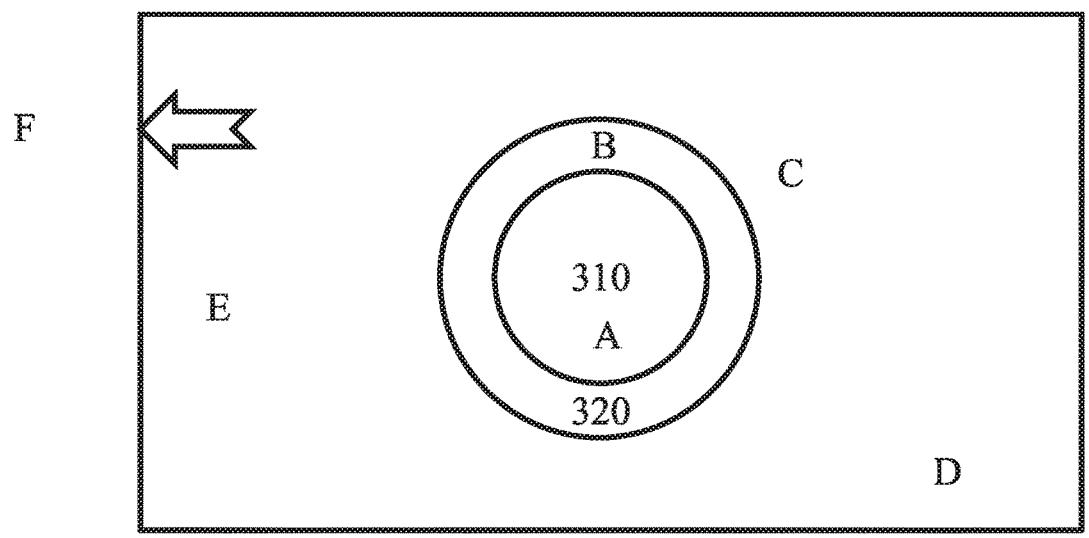
FIG. 3 schematically illustrates a calibration display.

FIG. 3 schematically illustrates a screen that may be displayed to a user during a calibration process for capturing information about head and/or eye motion. A display 300 (corresponding to a view provided by an HMD, for example, or a display screen such as a TV) is shown with concentric circles 310 and 320 that illustrate a user's focus area and a surrounding region of vision respectively.

A number of markers are also shown on the display 300, represented by letters A-E, and the user may be invited to look at each of them in turn. A further marker (F) is shown that is outside of the display 300, but may be viewable by a user changing the viewpoint that is displayed—depending on the arrangement, this may be performed by user input or head motion, for example. An example of a calibration process using this arrangement is provided below.

Firstly, a user is instructed to look at the letter A; as this is within the region 310 this is expected to result in little or no eye motion, and no head motion. The user may be invited to provide an input (such as a button press or spoken command) to indicate that they are looking at the letter A, or this may simply be identified using eye tracking data.

The user is then instructed to look at the letter B. As this is only slightly out of the central area 310 of the user's gaze, it is expected that most users will simply adjust their gaze upwards such that the region 310 is now centred on (or at least contains) the letter B. This would be expected to be performed Following this, the user may then be immediately directed towards the letter C, or may be instructed to return to marker A before progressing to viewing the letter C.

The letter C may not be visible to a user, or only visible in the user's peripheral vision. It would likely be uncomfortable for many users to view the letter C using eye motion alone. Viewing the letter C would therefore be expected to induce a head motion from most users.

The viewing of the letter D provides a similar effect to that of viewing the letter C, albeit more exaggerated. A larger head motion would be expected here that that associated with viewing the letter C, due to the increased distance between letters.

In a similar fashion, the viewing of the letter E would be expected to induce an even larger head motion from the user. When the user transitions between viewing letters with a larger separation, the combination of head and eye motion performed by the user may be identified. For example, a first user may move their head such that the letter appears in the centre of their vision—thereby performing head motion with no eye motion. A second user may move their head only far enough to enable the user to perform their maximum comfortable eye motion in order to view the letter. Other users may perform combinations of head/eye motion that lie between these two, and this may be identified through a number of different transitions being induced by the calibration process.

The final letter, F, that is shown is outside of the display area 300. An arrow is provided that indicates to the user where the letter F may be found—the user should then either provide controller inputs or rotate their head/body sufficiently to cause the letter F to enter the display area 300.

By instructing the user to perform a number of viewpoint changes of different magnitudes and directions, a profile may be generated. For example, the largest distance between markers that a user will view without performing any head motion may be identified. The combinations of head motion, user input, and eye motion used to view a marker a particular distance away may also be identified; for example, a profile may comprise a list of angular separations between displayed objects (such as an entry for every five or ten degrees of separation) and the action performed by the user. Optionally, such angular separation may be separated into horizontal and vertical components with entries for each, since user mobility and behaviour may be different for similarly sized horizontal and vertical angular separations. Similarly optionally, the letters/markers shown in FIG. 3 may be positioned or sequenced to cause at least some predominantly horizontal or predominantly vertical transitions of eye and/or head motion during calibration.

The actions performed may be recorded in any suitable manner; one example of a suitable method is that of a lookup table with three columns. A first column may relate to eye motion, a second to head motion, and a third to body/torso motion. Each of these may comprise a value indicative of the amount of motion performed—for example, an angular change to the viewpoint resulting from each component, or a percentage of the transition motion that is contributed by each component.

Alternatively, or in addition, a categorisation may be applied to each user that matches them to a reference profile that resembles their pattern of eye/head/body motion. In a most basic example, a user could be classed as a 'head-mover' if they move their head more frequently than some threshold amount or an 'eye-mover' if they do not. Any number of categories could be defined, so as to represent the spectrum of different users in a suitably accurate manner.

Of course, the order in which a user is instructed to view different markers may be varied. Different markers may also be provided for different users, and the number of markers used may be selected freely—indeed, the calibration process may be open-ended and continue generating markers until a suitably accurate profile is generated.

In some examples, the order, number, and location of markers may be varied in response to the calibration data as it is generated. For example, markers may be selected to alternately induce head motions and only-eye motions; by doing this, the boundary at which a user begins to use head motions in addition to eye motion may be identified more quickly in some cases.

Alternatively, or in addition, the order, number, and location of markers may be selected in dependence upon user information. For example, a user could provide information about their habits (or information could be gathered by performing tracking pre-calibration) to determine whether significant head motion is expected or not. Similarly, statistical data about a user (such as age, gender, or height) and/or their equipment usage (TV/HMD, distance from display, main applications/application type) may be used to identify an expected profile, and calibration may be performed to identify deviations from this expected profile. Such an expected profile may be derived from statistical data gathered through other calibrations, for example.

Calibrations may also be performed in different use cases, so as to generate a time- or user condition-based profile. For instance, as a user becomes more tired (either at night, on a work/school night, or after a long gaming session, for example) the amount of user head motion may be reduced significantly in favour of eye motion as this would be less energetic for the user. Alternatively, or in addition, changes due to these (or other) factors may be modelled and applied to a single or a small number of calibrations by a user.

The format of markers may be varied in order to provide a more detailed profile; for example, users may respond to different colours in different manners. A visually striking colour, such as a bright yellow or red, may induce a greater head motion than a less visually striking colour, such as a pale blue or green. This may be a result of certain colours either catching the user's attention more due to personal preference, or by being colours associated with particular emotions (such as fear or danger). Similarly, some shapes may have different effects on the user's actions and therefore markers having different shapes may be incorporated into a calibration process.

In some embodiments, the calibration process may incorporate a time-limited element. Generally, eye motion is faster than head motion and so it may be expected that some users may increase their reliance on eye motion over head motion when a faster viewing transition is required. This may be implemented in a number of ways—for example, a timer may be provided, or the user may be rewarded for performing the calibration process (or a portion of the process) within a particular time. Alternatively, or in addition, markers may be designed so as to encourage a faster head motion by using particular colours or shapes and/or the calibration may be provided in a context that causes a user to become more (or less) excited and therefore react more (or less) energetically.

Once a user profile has been generated, any future calibrations may be tailored so as to be more comfortable for that user. An example is in the case that an initial calibration is performed upon setup of the HMD (or other system), and an application-specific or refresher calibration is performed at a later date. A refresher calibration may be either to ensure that the user's profile has not changed since an earlier calibration, or to assist in calibrating a new eye-tracking arrangement, for example. In some embodiments, a determination may be made by the device that identifies when such a recalibration is required; for example, indications that a user's eye/head motion ratios have varied since an initial calibration. Alternatively, or in addition, the recalibration process may be driven by the identification of a particular milestone or threshold being met, such as the obtaining of new equipment, time since previous calibration, and/or in-game time since previous calibration.

In such embodiments it may be possible to identify which areas users do not tend to view with eye motion only, and to reduce the number of markers presented in these areas for calibration purposes (in some cases, reduce the number to zero).

Figure 4:
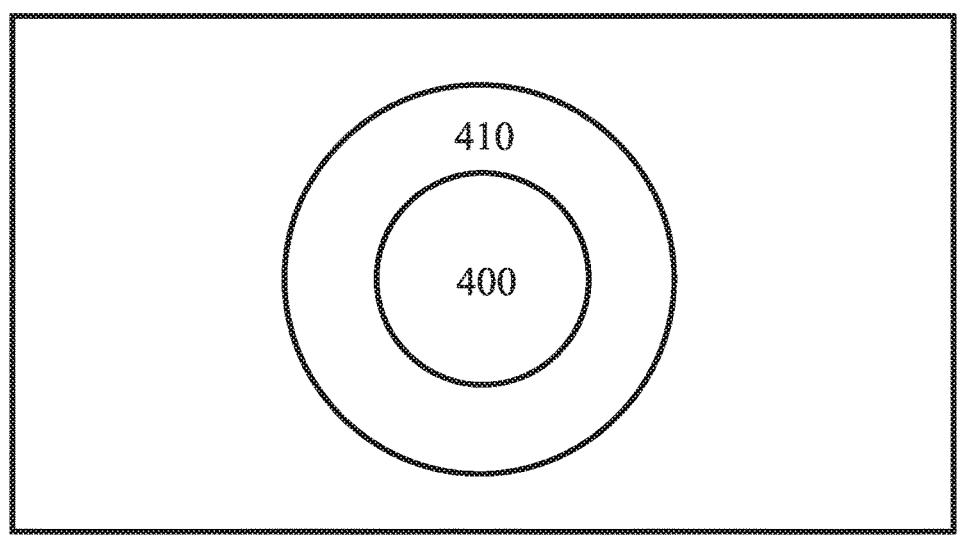
FIG. 4 schematically illustrates an eye-in-head radius.

For example, FIG. 4 shows a central region 400 in which a user is determined to be most comfortable using eye motion alone. This may be an area in which all motions by the user would be eye motion only, or at least an above-threshold percentage.

Surrounding the central region 400 is a secondary region 410 in which the user sometimes uses head motion instead of (or in addition to) eye motion, but would still be comfortable using eye motion alone.

Outside of the secondary region 410 it is taken that the user is not able to view content comfortably with eye motion alone.

Of course, users may be more comfortable moving their eyes and/or head in some directions than others; in such a case, it is not required that the regions 400 and 410 are circular and they may instead take any suitable shape.

In view of this, it is expected that most, or in some embodiments all, calibration markers are present in the regions 400 and 410. While a small number may be outside of the region 410, this number should be limited in view of the fact that it would cause discomfort for the user to view them without moving their head. The sizes of the regions 400 and 410 may be determined in dependence upon previous calibration information or a user's motion profile.

The user profile that is generated may also be used in other alternative/additional ways. In one example, a user's profile information is used to characterise their interactions with displayed content. For instance, 'anomalous' interactions (that is, those actions which deviate from the expected actions as suggested by the user profile) may be taken to be indicative of particular user interest in a displayed object or the like.

Foveated rendering refers to a group of techniques that are used to generate images for display that comprise areas of high visual quality and areas of low visual quality in dependence upon a detected (or predicted) gaze direction of a user. Benefits are derived from these methods by exploiting the fact that a central region of a user's vision has a much higher level of visual detail than surrounding regions; as a result of this, a user may find it difficult to distinguish between high-quality images and low-quality images in these surrounding regions.

In the present disclosure, references to the quality of an image may relate to any number of characteristics of the image—for example, a high-quality image (or image area) may have a higher resolution, use a greater number of colours, use higher-resolution meshes and textures, show three-dimensional elements rather than two-dimensional elements, and/or have a higher refresh rate.

For example, an area of high resolution is provided at the centre of the viewer's gaze in an image, while the rest of the image is rendered at a lower resolution. To a user, this image would be expected to appear to be the same as an image displayed entirely at high resolution due to the reduced visual acuity in the surrounding areas and/or the inability to view anything outside of the user's peripheral vision.

Such methods may be advantageous in reducing the amount of power required for the display or processing of the content, as well as in reducing the data requirements for storing the content. For example, portions of a display may be updated less frequently and/or at a lower effective resolution, and the processing time for generating rendered images may be reduced—each of these lowers the power usage of the respective devices. With regards to data transmission, it is expected that reducing the amount of information that needs to be sent will lower the amount of power required to transmit that data. The reduction in power consumption resulting from the implementation of embodiments of the present disclosure may therefore be significant.

Figure 5:
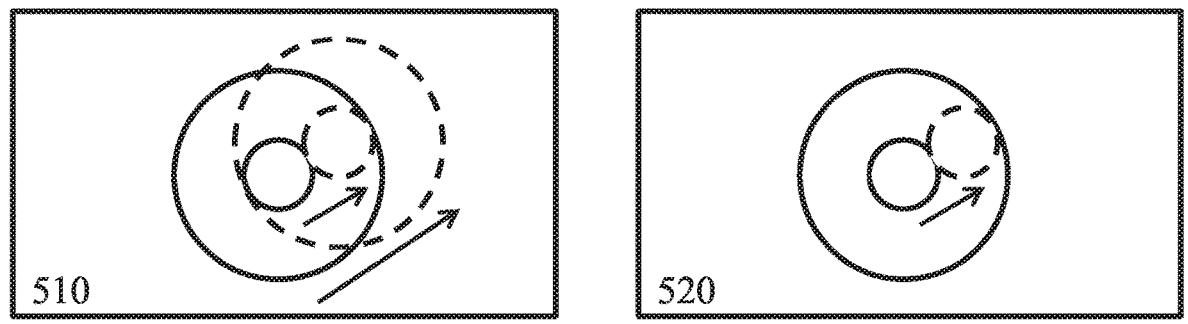
FIG. 5 schematically illustrates examples of two different methods for performing a viewing transition.
Figure 5:

FIG. 5 schematically illustrates examples of two different methods for performing a viewing transition. FIG. 5 shows a user wearing an HMD, and the display that is associated with that HMD (although of course, these teachings could be applied to a more typical display screen arrangement such as a television). A viewing transition here means the action performed by a user to transfer their gaze from one part of a display to another. In the examples 510 and 520, the user 500 has moved their gaze and/or eye-in-head radius from the areas denoted by the solid lines to the areas denoted by the dashed lines. The smaller circle shows the focus position (equivalent to the region 400 of FIG. 4) while the larger circle shows the eye-in-head radius (equivalent to the region 410 of FIG. 4).

In the example 510, the user 500 performs the viewing transition by moving their head only, with the eye position remaining stationary with respect to the user's head. As noted above, this method of performing a transition is considered to be rare.

The example 520 shows the opposite method of performing the transition; the user 500 moves only their eyes, with the head position remaining stationary with respect to the display.

Figure 6:
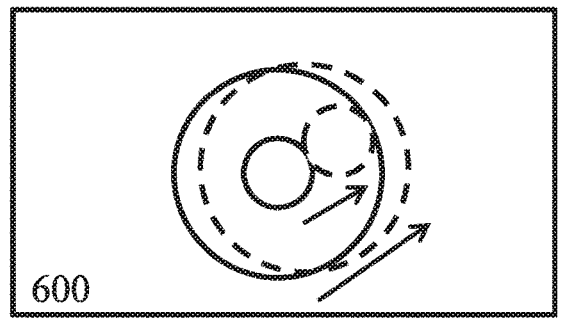
FIG. 6 schematically illustrates a further viewing transition example.
Figure 6:
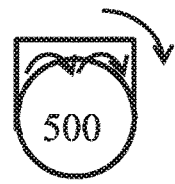

FIG. 6 schematically illustrates the middle-ground between these two examples 510 and 520. In the example 600, the user 500 moves their head a smaller distance than in the example 510 while also moving their eyes as in the example 520 (although to a lesser degree, due to the head motion).

Of course, the respective quantities of head and eye motion used to perform a particular viewing transition will vary from user to user. The information about the respective quantities of each motion for one or more transitions or transition types (such as large/small transitions) is stored in the user profile, as discussed above.

Figure 7:
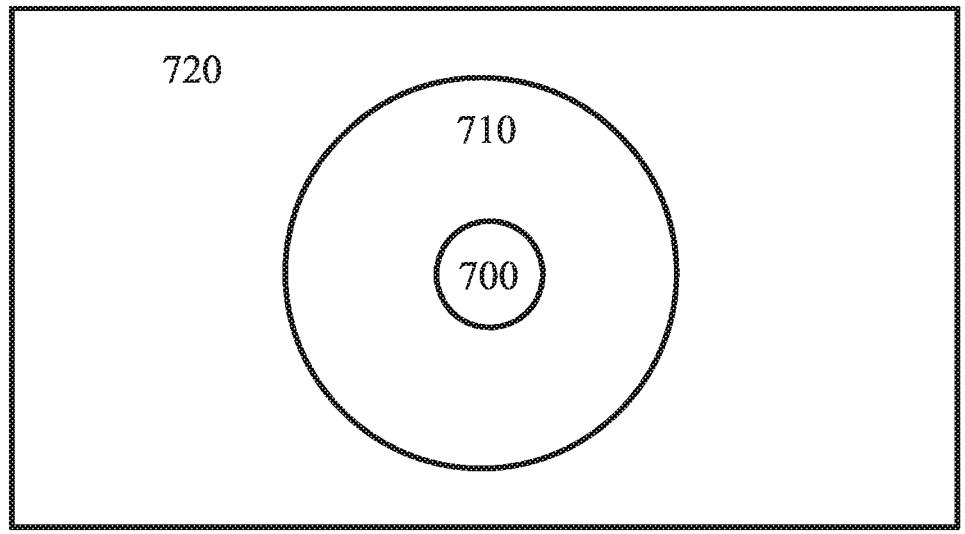
FIG. 7 schematically illustrates a display screen divided into areas.

FIG. 7 schematically illustrates a display screen 300 divided into areas in accordance with an exemplary foveated rendering method. In this example three regions have been identified, however any number of regions equal or greater than two may be appropriate.

The region 700 corresponds to central region of the user's vision—that is, the part of the user's vision with the highest visual acuity—while the region 710 corresponds to the remaining area of the user's vision. While each of these is shown as being circular, this is merely a simplification to aid clarity; it should be understood that these areas may be expected to have non-circular shapes. The region 720 represents the rest of the display area outside of the user's vision.

The size of each of the regions 700 and 710 is often increased relative to the equivalent areas of the user's vision; this leads to a more robust system, in which a user's experience is not impacted by inaccuracies in the gaze tracking process or the like.

In a foveal rendering arrangement, the region 700 will be displayed with the highest image quality, while the region 710 is rendered with a lower image quality. The region 720 may be rendered with a quality equal to that of the region 710, or it may be rendered with a lower quality still.

The location of the regions may be determined using gaze detection methods to identify which area of the display screen 300 is being viewed. For example, one or more cameras may be directed towards the user's eyes to determine their orientation, from which information about which area of the display screen 300 is being viewed can be derived. Once this information has been obtained, the region 500 may be positioned at the identified area of the display screen 300. Alternatively, or in addition, predictive methods may be used to determine an assumed gaze direction—for example, in some arrangements it is assumed that the user will focus on the main actor in a movie scene, or a particular enemy in a game. These elements, and any surrounding elements, may then be rendered with a higher image quality as a result of this determination.

In known arrangements, foveal rendering is performed immediately before display. For example, a device may store both a high-resolution and a low-resolution copy of a video and combine the two as appropriate in response to a detection of a user's gaze direction. In other examples, such as for games, content is rendered in response to a detection of a user's gaze direction in real-time.

Figure 8:
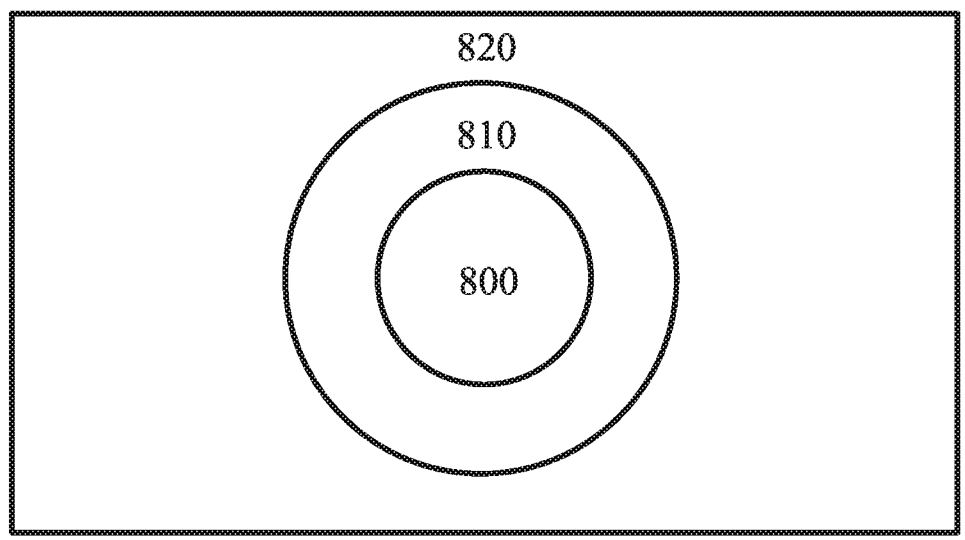
FIG. 8 schematically illustrates the screen separated into three regions.
Figure 9:
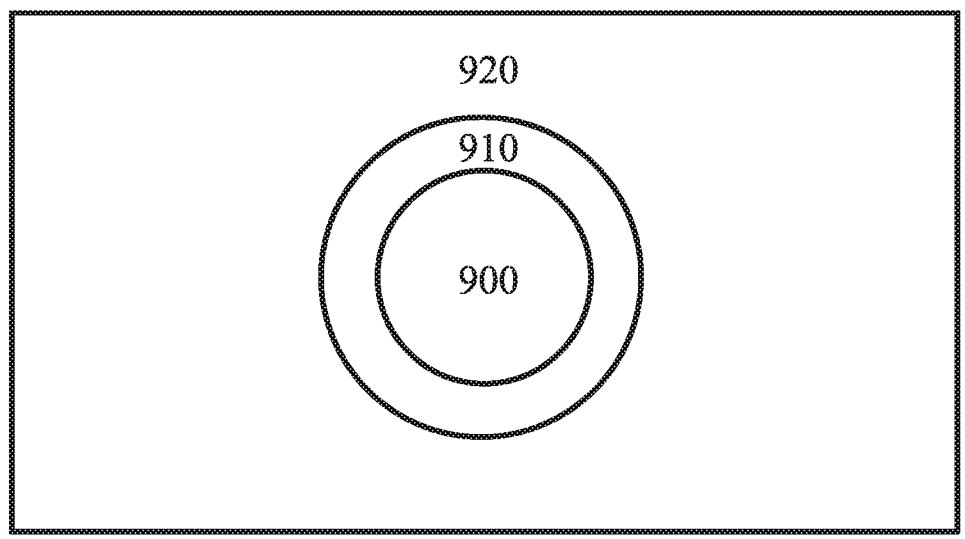
FIG. 9 schematically illustrates the screen separated into three different regions.

In the present application, we consider the use of information contained in the user profile. As discussed above, the user profile comprises information about a user's preferred use of head and/or eye motion for viewing content. FIGS. 8 and 9 show examples of 'eye-mover' and 'head-mover' vision profiles, which are characterisations of user head and/or eye motion that may be derived from the user profile.

FIG. 8 schematically illustrates the screen 300 separated into three regions. The first of these is the inner, or focal, region 800—this is the area that occupies the centre of a user's gaze when the user directs their head and eyes towards the centre of the screen 300. This is an area that would be most in-focus for a viewer.

The surrounding region 810 represents the region of the screen 300 that the user is able to see, for example in their peripheral vision, but would need to move their eyes/head to be able to view correctly. The extent of the region 810 is equivalent to the range of motion of a user's eyes—the boundary between the areas 810 and 820 represents the outermost area that a user is able to view by moving their eyes only, which may be referred to as a maximum eye-in-head radius.

The remaining region 820 of the screen 300 corresponds to areas which the user is not able to view without moving their head—that is, even at a maximum eye rotation by the user they are unable to view any areas outside of the regions 800 and 810.

Of course, the regions 800 and 810 can be determined on a per-user basis. In addition to this, or instead, the regions may be determined upon user preferences rather than a user's physical limitations. For example, the region 810 may be smaller for a first user than a second user of equal physical capabilities if the first user is more inclined to move their head than to change their view using eye motion only (for example, a 'head-mover' as described above). In this sense, the region 810 may be considered a preferred eye-in-head radius, rather than a maximum. References to the eye-in-head radius in this specification should be taken to mean either the physical maximum or the preferred maximum eye motion for a given head position.

It should be considered that some users may be more comfortable moving their eyes and/or head in some directions than others; in such a case, it is not required that the regions 800 and 810 are circular and they may instead take any suitable shape.

FIG. 9 schematically illustrates an example in which a user has a smaller preferred (or maximum) eye-in-head radius than that shown in FIG. 8. While the focus area 900 is the same as the area 800 in FIG. 4, the region 910 is much smaller than its counterpart 810 in FIG. 8. Of course, the region 920 is larger than the region 820 as a result of this.

It should therefore be considered that it is possible to provide a foveated rendering system that is dependent upon information contained in the user profile. For example, based upon the above characterisation it is considered that the size of each of the regions of differing image quality may be tailored to a specific user.

More particularly, it is apparent that the region of highest image quality should be the same size for each of these characterisations (as the areas 800 and 900 are the same size) while the surrounding region should be larger for the eye-mover as it is more likely that they will view the corresponding display areas.

In some embodiments, it may be considered advantageous to increase the size of the central high-quality region for a user that exhibits a large amount of eye motion—this may increase the resilience of the foveal rendering system, particularly in view of the fact that eye motion is generally faster than head motion.

User profiles may also identify a user as having different movement profiles for different directions. For example, a user may be more inclined to move they eyes for motion in a particular direction (such as side-to-side) than in another direction (such as up and down), and as such a foveal rendering region may have a non-circular shape to reflect this. For instance, in that example a foveal rendering region may have an elliptical shape with the major axis arranged horizontally.

In addition to this, the user profiles may also identify a user as having different movement profiles for different content. For example, a user may be more inclined to use a greater proportion head motion when playing a video game than when watching a movie (for example, due to increased level of immersion). Similarly, the user profiles may identify this on a per-genre basis, or indeed any suitable categorisation of content. For instance, the user may be more inclined to use a greater proportion of head motion when viewing 'action' content than when viewing 'comedy' content.

This may also be implemented in dependence upon user preferences—for example, users may have a different movement profile for favoured content. Favoured content may include a particular genre, piece of content, or component (such as an actor or location) of the content. In either case, it is considered that the user's profile information may be used to identify an appropriate foveal rendering to be applied to content to be viewed—either directly (in that the appropriate rendering is specified in the information) or indirectly (in that the appropriate rendering can be predicted in dependence upon the information).

As noted above, time- or condition-based user profiles may be considered advantageous in some embodiments. Such profiles may specify varying ratios of eye-motion to head-motion. For example this variance may be specified such that as the duration of a user's viewing session increases, the ratio of eye-motion to head-motion that is expected varies to account for user fatigue or the like. Similarly, a determination of the user's condition (such as a measure of their tiredness, which may be detected from any suitable biofeedback or indicators such as button press strength and user responsiveness or the like) may be used to determine a similar variation.

While a foveal rendering method may be tailored for each user in response to their own user profile, in some cases this may not be possible or efficient. For example, on devices with a more limited amount of processing power or a slower network connection (such as a mobile phone) it may not be practical to perform real-time foveated rendering. In such cases, it may be advantageous to pre-render content with a foveated rendering scheme already applied. Of course, it would not be feasible to perform this on a per-user basis nor would it be possible to perform this in dependence upon information about a user's current gaze position.

In order to address this, user profiles may be categorised into one or more of a plurality of different groups that are representative of groups of users. Examples of these are provided above (the eye-mover and head-mover groups), although it is envisaged that any number of alternative or additional groups may be identified based upon their common characteristics. The number of groups may be significantly smaller than the number of users, reducing the number of differently-rendered streams that would need to be generated, stored, and transmitted.

Of course, such a group-based foveated rendering method may also be implemented when performing real-time foveated rendering—it need not be limited to pre-rendered content. For example, using a group-based foveated rendering method may reduce the burden on a content developer in specifying how they wish the foveated rendering to be applied for a piece of content.

In some examples, it may be the case that a number of these profiles have significant overlap in the foveated rendering that is applied. In this case, processed content may be shared between different groups so as to reduce the amount of content that needs to be stored. Even if the overlap is not so significant, it may be the case that applying a foveated rendering that would enable a high-quality viewing experience for users of both groups is preferred. While this may result in a larger file size (due to an increased high-quality region to incorporate foveated areas from both/all user groups), it may still be seen as beneficial that only a single file is required rather than multiple files.

It may further be the case that areas are identified in the content that are rendered in the same way for each group. For example, it may be the case that a majority of users do not look up when viewing the content—as such, it is possible to generate a stream in which this area is rendered at a lower quality for all viewers.

In some embodiments, a user is provided with content that is tailored to their user-profile based on a grouping (as discussed above). However, in some embodiments this content may have a further foveated rendering applied that is specific to the user. In such embodiments, this may result in a two- or three-step foveated rendering process.

A multi-step foveated rendering process may be advantageous in that the amount of processing to be applied can be reduced at each stage; this may increase the efficiency of each device performing a foveated rendering process, in addition to lowering response times for displaying such content when the foveated rendering is being performed in real time.

Figure 10:
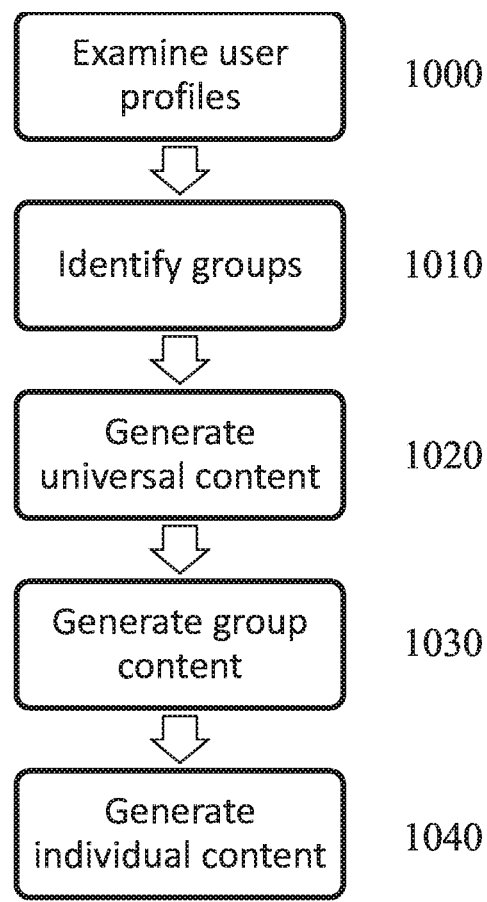
FIG. 10 schematically illustrates a foveal rendering process.

FIG. 10 schematically illustrates an example of such a process.

In a step 1000, user profiles are examined. This may comprise an identification of the user profile for a specific user (such as one that has requested content), and/or the identifying of a representative group of user profiles. For one or more of these groups a foveated rendering profile may be identified or generated so as to be able to identify the foveated rendering that should be applied to content to be provided to one or more users.

In a step 1010, groups are identified in the user profiles. For example, users may be classified based upon their preferred head and/or eye motions. Such a grouping may already exist in the user information, for example having been generated upon calibration of the device or through viewing earlier content, in which case the groups may be identified without further analysis.

In a step 1020 universal content is generated; that is, content which is suitable for every group of users. In some examples, this may simply be an un-foveated piece of content, while in others foveated rendering may be applied to the content at this stage. This content may be made available to users directly, or may be provided to a server that modifies the content further before providing it to users.

In a step 1030, group content is generated; that is, content which is tailored (using foveated rendering processes) to one or more groups is generated. Each of these pieces of content may be made available to a user, or one is selected for a user in dependence upon their user profile. The group content is generated from the universal content—which (as noted in step 820) may have been subject to a foveated rendering process. While group content may be generated on a per-group basis, of course a single piece of group content may be generated for a plurality of groups.

In a step 1040, individual content is generated. This is content that is tailored (using foveated rendering processes) to a specific user (rather than a whole group), and may be based upon one or both of the information in the user profile and gaze tracking information for that user. The individual content may be generated from group or universal content, as appropriate for the application.

Steps 1020-1040 may be performed in any suitable combination—in some embodiments, only one or two of these steps may be performed. For example, in some cases the universal content may be provided to a user and then individual content is generated directly from this (omitting step 1030). Alternatively, step 1040 may be omitted entirely and a user is instead provided with the group content generated in step 1030.

Each of the steps 1020-1040 may have a different foveated rendering process applied such that not only are the high-quality and low-quality regions different, but the difference between the high and low-quality regions caused by each step may be different. For example, the step 1020 may result in an image with a small difference between the high-quality area and low-quality area (as it corresponds to the highest number of people), while the lowering of image quality in low-quality image regions in the step 1040 is much more aggressive (as this is tailored to a specific user).

Figure 11:
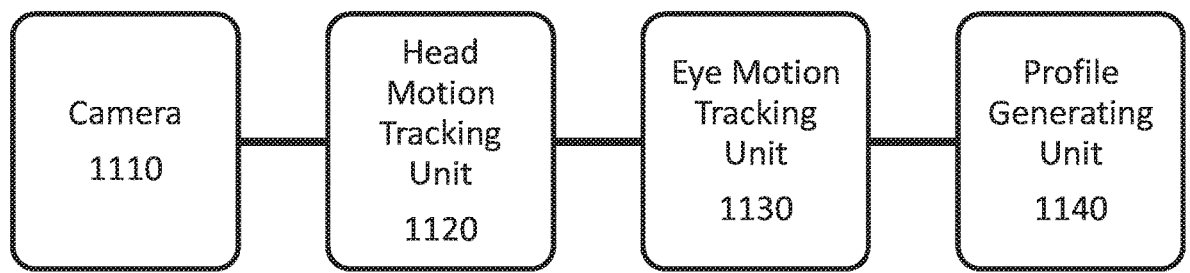
FIG. 11 schematically illustrates a user profile generating system.

FIG. 11 schematically illustrates a user profile generating system 1100 for generating a user profile for use with a processing device operable to display content. The system 1100 optionally comprises one or more cameras 1110, a head motion tracking unit 1120, an eye motion tracking unit 1130 and a profile generating unit 1140.

The one or more cameras 1110 are optionally operable to capture images of a user; examples of suitable devices include any visible light or IR cameras that capture images that may be used to identify motion of a user and/or the user's eyes. In some embodiments, cameras are used to detect both head and eye motion of a user, while in others specialised cameras (or other tracking devices) may be used to determine each motion. For example, imaging devices may be present in an HMD that are used to track eye motion. Alternatively or in addition, head motion may be determined from accelerometers or the like on a head mounted display. Similarly, one or more cameras may be mounted on the head mounted display to track apparent motion of the environment, thereby determining head motion, rather than capturing an image of the user themselves. Meanwhile, motion tracking of one or both of the user's eyes may be achieved by one or two cameras observing a respective eye, or other tracking methods known in the art.

The head motion tracking unit 1120 is operable to identify head motion of the user, for example from images of the user captured by the one or more cameras 1110. This may be achieved using any suitable motion tracking method. In some embodiments, the user may wear one or more markers that are used to simplify camera-based tracking methods. Alternatively, or in addition, the head motion tracking unit 1120 may use motion sensor data (such as from an accelerometer mounted upon an HMD worn by a user)—it is not essential that captured images are used to detect user head motion. It is therefore apparent that the head motion tracking unit is operable to identify head motion in dependence upon motion sensor data and/or camera data.

The eye motion tracking unit 1130 is operable to identify eye motion of the user; this may be performed using images captured by the one or more cameras 1110. Each eye may be tracked individually, or a single eye may be tracked and models used to predict a point of focus in dependence upon this, for example.

The profile generating unit 1140 is operable to generate a user profile comprising head motion and eye motion information for the user. This motion information may be generated over any suitable period of time—for example, over a short calibration period, or over the whole of the user's experience with the system such that the profile is updated constantly. The generated user profile is used to modify interactions between the user and a processing device; as discussed above, this may be performed by modifying content in response to a calibration process using the profile information, or by modifying content in response to a characterisation of user interactions as compared to the user profile information.

As described above, a user profile identifies user preferences for eye motion and head motion. In some embodiments the user profile identifies proportions of head motion and eye motion used by a user in performing one or more viewing transitions between displayed content elements, and may also (or instead) identify a user as belonging to one or more categories in dependence upon their preferences for eye motion and head motion.

Interactions, as referred to above, may be any one or more of the list comprising viewing content, gaze-based inputs, gesture inputs, spoken inputs, and control device inputs. For example, a viewer that observes content is considered to be interacting with the content, as is a user who provides an input based upon their gaze direction, a hand or arm gesture, a voice command or a button press on a game controller. Of course, in some embodiments it is considered that a gaze direction may be combined with one or more of the other inputs to determine an interaction that is to take place.

Figure 12:
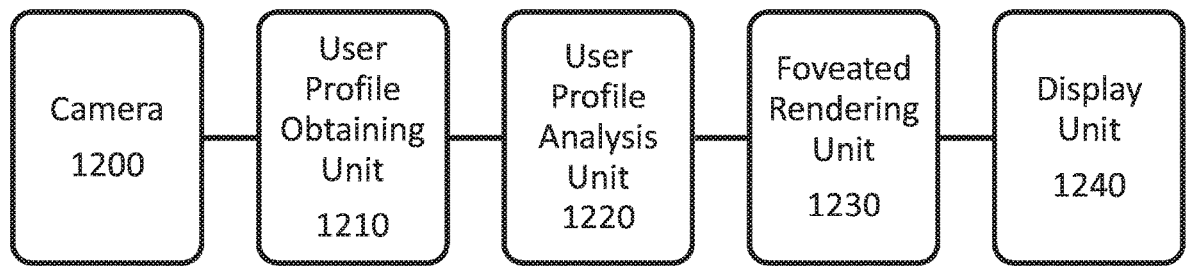
FIG. 12 schematically illustrates a foveated rendering system.

FIG. 12 schematically illustrates a foveated rendering system for modifying content to be displayed. This system comprises a camera 1200, a user profile obtaining unit 1210, a user profile analysis unit 1220, a foveated rendering unit 1230, and a display unit 1240. Of course, the camera 1200 and display unit 1230 should be considered to be optional—the functions relating to these devices may be performed by other systems associated with the foveated rendering system.

The camera 1200 may be the same as the camera 1110 used in the user profile generating system 1100, if the two systems are provided together. Alternatively, these cameras 1200 may be a different one or more imaging devices operable to capture images to be used for head and/or eye tracking of a user. For example, the camera 1200 may be located within an HMD worn by a user, or may be located away from the user to capture images of the whole of the user's body. Of course, the camera 1200 could comprise both of these as well as any other number of imaging devices that are useful for performing tracking of a user.

The user profile obtaining unit 1210 is operable to obtain a user profile comprising head motion and eye motion information for a user. The user profile may be generated by an associated profile generating system 1100, or may be acquired from a storage medium or any other suitable information source.

As described above, a user profile identifies user preferences for eye motion and head motion. In some embodiments the user profile identifies proportions of head motion and eye motion used by a user in performing one or more viewing transitions between displayed content elements, and may also (or instead) identify a user as belonging to one or more categories in dependence upon their preferences for eye motion and head motion.

In addition to the user profile obtaining unit 1210, the system may comprise the user profile analysis unit 1220. Such a unit may be optional, as the functions that it performs are not essential for the operation of the foveated rendering system. The user profile analysis unit 1220 is operable to determine characteristics of one or more groups of users in dependence upon the obtained user profiles. For example, the user profile analysis unit 1220 may be operable to determine characteristics of a single group comprising all users (or operable to identify characteristics that correspond to an above-threshold number of users representing the group of all users) so as to identify global user characteristics for use in step 1020 of FIG. 10, and/or operable to identify one or more groups of users according to shared characteristics between user profiles so as to identify user group characteristics for use in step 1030 of FIG. 10.

In some embodiments, the user profile analysis unit 1220 is operable to obtain information about a set of user profiles stored online, for example, while in others it may be able to download multiple user profiles. In some embodiments, the user profile analysis unit 1220 is operable to receive information about different user groups as appropriate, for example from a server for generating and storing such information.

The foveated rendering unit 1230 is operable to apply a foveated rendering process to the content to be displayed in dependence upon obtained user profile information. For example, the foveated rendering unit 1230 may be operable to perform any one or more of the steps 1020-1040 of FIG. 10. As discussed above, the foveated rendering process is operable to generate an image with low-quality and high-quality image regions, such that high-quality image regions comprise one or more of an increased resolution, increased number of colours, increased frame rate, and/or an increased use of three-dimensional imagery relative to the low-quality regions.

In some embodiments, the foveated rendering unit 1230 is operable to modify the size and location of high-quality image regions in the processed image in dependence upon obtained user profile information. For example, this modification may be performed such that the size and location of high-quality image regions are dependent upon head motion and eye motion used by a user in performing one or more viewing transitions between regions of the displayed content.

For example, the foveated rendering unit 1230 may be operable to apply a foveated rendering process to the content to be displayed in dependence upon the characteristics determined by the user profile analysis unit 1220 relating to a single group comprising all users (or an above-threshold number of users considered to represent the group of all users).

Alternatively, or in addition, the foveated rendering unit 1230 may be operable to apply a foveated rendering process to the content to be displayed in dependence upon the characteristics determined by the user profile analysis unit 1220 so as to generate a processed content to be displayed for each group.

As would be apparent from the above discussion, the foveated rendering unit 1220 is operable to apply a foveated rendering process to content to be displayed that has already been subjected to a foveated rendering process. That is, the foveated rendering unit 1220 is operable to perform two or more of the foveated rendering steps referred to in steps 1020-1040 of FIG. 10 to the same image content.

The foveated rendering unit 1230 may be operable to apply a foveated rendering process to the content to be displayed in dependence upon the user's detected gaze direction; although in some cases a predicted gaze direction or the like may be used instead (for example, based upon a user's profile information or expected objects of interest within a piece of content). If the user's detected gaze detection is used, the foveated rendering system should comprise a gaze detection arrangement operable to detect a user's gaze direction—for example, using a camera 1200 to capture images of the user's eyes that are used to detect a gaze direction.

Figure 13:
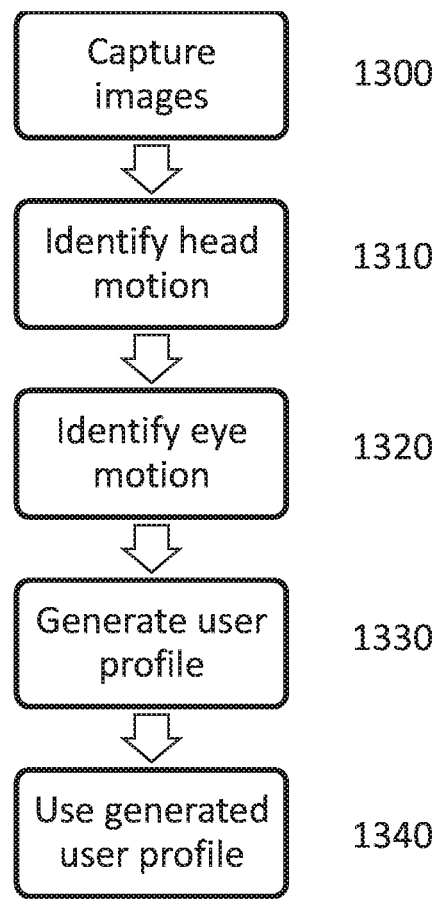
FIG. 13 schematically illustrates a user profile generating method.

FIG. 13 schematically illustrates a user profile generating method for generating a user profile for use with a processing device operable to display content.

A step 1300 comprises optionally capturing images of a user; this step 1100 may further comprise gathering data from inertial sensors or the like that may also be used to identify motion of the user.

A step 1310 comprises identifying head motion of the user.

A step 1320 comprises identifying eye motion from images of the user.

A step 1330 comprises generating a user profile comprising information about head motion and eye motion for the user.

Figure 14:
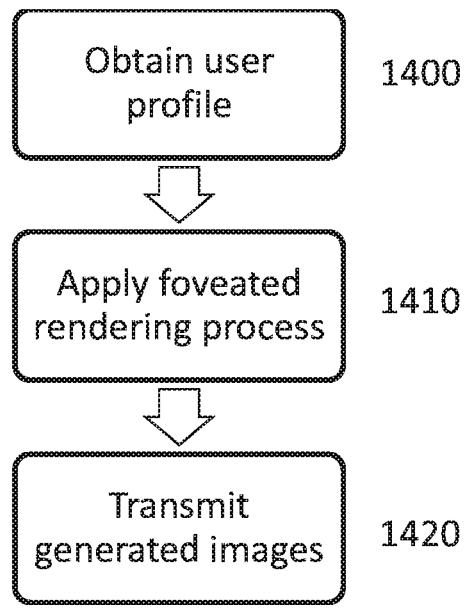
FIG. 14 schematically illustrates a foveated rendering method for modifying content to be displayed.

FIG. 14 schematically illustrates a foveated rendering method for modifying content to be displayed.

A step 1400 comprises obtaining the user profile comprising information about head motion and eye motion for a user. This may comprise an analysis of one or more user profiles, so as to determine characteristics of the one or more profiles and determine groups or the like.

In some examples, the step 1400 may comprise one or both of the steps 1000 and 1010 of FIG. 8.

A step 1410 comprises applying a foveated rendering process to the content to be displayed in dependence upon obtained user profile information; for example, performing any one or more of the method of steps 1020-1040 of FIG. 10.

An optional step 1420 comprises the transmission of generated images. For example, this may comprise the transmission of the images to a user, another computer/storage device, or to a display for presentation to a user.

In some embodiments, the method of FIG. 14 may also comprise gaze tracking steps for detecting the gaze direction of a user as well as the display of the processed content to a user.

The techniques described above may be implemented in hardware, software or combinations of the two. In the case that a software-controlled data processing apparatus is employed to implement one or more features of the embodiments, it will be appreciated that such software, and a storage or transmission medium such as a non-transitory machine-readable storage medium by which such software is provided, are also considered as embodiments of the disclosure.

The invention claimed is:

1. A foveated rendering system for modifying content to be displayed, the system comprising:
   a user profile obtaining unit operable to obtain a user profile, comprising user profile information about head motion and eye motion for a user;
   a foveated rendering unit operable to apply a foveated rendering process to the content to be displayed; and
   a user profile analysis unit operable to determine characteristics of one or more groups of users in dependence upon the obtained user profiles,
   wherein the foveated rendering process is dependent on the user profile information obtained from the user profile, and
   wherein at least one of:
   (i) the user profile analysis unit is operable to identify characteristics that correspond to an above-threshold number of users representing the group of all users, and
   (ii) the user profile analysis unit is operable to identify one or more groups of users according to shared characteristics between user profiles, and the foveated rendering unit is operable to apply the foveated rendering process to the content to be displayed in dependence upon the characteristics determined by the user profile analysis unit so as to generate a processed content to be displayed for each group.

2. The foveated rendering system according to claim 1, wherein the user profile identifies user preferences for eye motion and head motion.

3. The foveated rendering system according to claim 2, wherein the user profile identifies proportions of head motion and eye motion used by a user in performing one or more viewing transitions between displayed content elements.

4. The foveated rendering system according to claim 1, wherein:
   the user profile analysis unit is operable to determine characteristics of a single group comprising all users, and
   the foveated rendering unit is operable to apply a foveated rendering process to the content to be displayed in dependence upon the characteristics determined by the user profile analysis unit.

5. The foveated rendering system according to claim 1, wherein the foveated rendering unit is operable to apply a foveated rendering process to content to be displayed that has already been subjected to a foveated rendering process.

6. The foveated rendering system according to claim 1, comprising a gaze detection arrangement operable to detect a user's gaze direction,
   wherein the foveated rendering unit is operable to apply a foveated rendering process to the content to be displayed in dependence upon the user's detected gaze direction.

7. The foveated rendering system according to claim 1, wherein the foveated rendering unit is operable to modify the size and location of high-quality image regions in the processed image in dependence upon obtained user profile information.

8. The foveated rendering system according to claim 7, wherein the size and location of high-quality image regions are dependent upon head motion and eye motion used by a user in performing one or more viewing transitions between regions of the displayed content.

9. The foveated rendering system according to claim 1, wherein high-quality image regions comprise one or more of an increased resolution, increased number of colours, increased frame rate, and/or an increased use of three-dimensional imagery.

10. A foveated rendering method for modifying content to be displayed, the method comprising:
    obtaining the user profile comprising user profile information about head motion and eye motion for a user; and
    applying a foveated rendering process to the content to be displayed; and
    determining characteristics of one or more groups of users in dependence upon the obtained user profiles,
    wherein the foveated rendering process is dependent on the user profile information obtained from the user profile, and
    wherein at least one of:
    (i) the determining characteristics step includes identifying characteristics that correspond to an above-threshold number of users representing the group of all users, and
    (ii) the determining characteristics step includes identifying one or more groups of users according to shared characteristics between user profiles, and the foveated rendering process includes applying the foveated rendering process to the content to be displayed in dependence upon the characteristics determined by the determining characteristics step so as to generate a processed content to be displayed for each group.

11. A non-transitory, machine-readable storage medium which stores computer software, which when executed by a computer, causes the computer to carry out actions for modifying content to be displayed, the actions comprising:
    obtaining the user profile comprising user profile information about head motion and eye motion for a user; and
    applying a foveated rendering process to the content to be displayed; and
    determining characteristics of one or more groups of users in dependence upon the obtained user profiles,
    wherein the foveated rendering process is dependent on the user profile information obtained from the user profile, and
    wherein at least one of:
    (i) the determining characteristics step includes identifying characteristics that correspond to an above-threshold number of users representing the group of all users, and
    (ii) the determining characteristics step includes identifying one or more groups of users according to shared characteristics between user profiles, and the foveated rendering process includes applying the foveated rendering process to the content to be displayed in dependence upon the characteristics determined by the determining characteristics step so as to generate a processed content to be displayed for each group.

* * * * *